United States Patent [19]
Showalter et al.

[11] Patent Number: 5,497,976
[45] Date of Patent: Mar. 12, 1996

[54] LOWER BLOCK ASSEMBLY FOR USE IN METAL SCARFING APPARATUS

[75] Inventors: Michael S. Showalter, Florence; David L. Pierce, Timmonsville; Stephen A. Engel; Raymond C. Smith, both of Florence, all of S.C.

[73] Assignee: The ESAB Group, Inc., Florence, S.C.

[21] Appl. No.: 375,418

[22] Filed: Jan. 18, 1995

[51] Int. Cl.⁶ .................................................. B23K 7/06
[52] U.S. Cl. ................................................ 266/51; 266/48
[58] Field of Search ................................ 266/48, 51, 52, 266/74

[56] References Cited

U.S. PATENT DOCUMENTS

| | | |
|---|---|---|
| 2,356,197 | 8/1944 | Jones et al. .......................... 266/48 |
| 2,838,431 | 6/1958 | Allmang et al. ....................... 266/51 |
| 4,115,154 | 9/1978 | Fuhrhop .............................. 266/51 |
| 4,389,038 | 6/1983 | Furhop ............................... 266/51 |
| 5,333,841 | 8/1994 | Showalter et al. ..................... 266/51 |
| 5,358,221 | 10/1994 | Showalter et al. .................... 266/51 |

*Primary Examiner*—Scott Kastler
*Attorney, Agent, or Firm*—Bell, Seltzer, Park & Gibson

[57] ABSTRACT

A lower block assembly for a thermochemical scarfing apparatus which comprises a base member and an extension releasably joined to the base member. The extension includes a continuous slot across its longitudinal length for delivering a stream of fuel gas onto the metal workpiece during the scarfing operation, and the base member and extension include a gas delivery system for delivering fuel gas to the slot at a substantially uniform rate along the entire longitudinal length of the slot and so as to achieve a uniform scarfing operation and a smooth scarfed surface across the width of the workpiece.

15 Claims, 4 Drawing Sheets

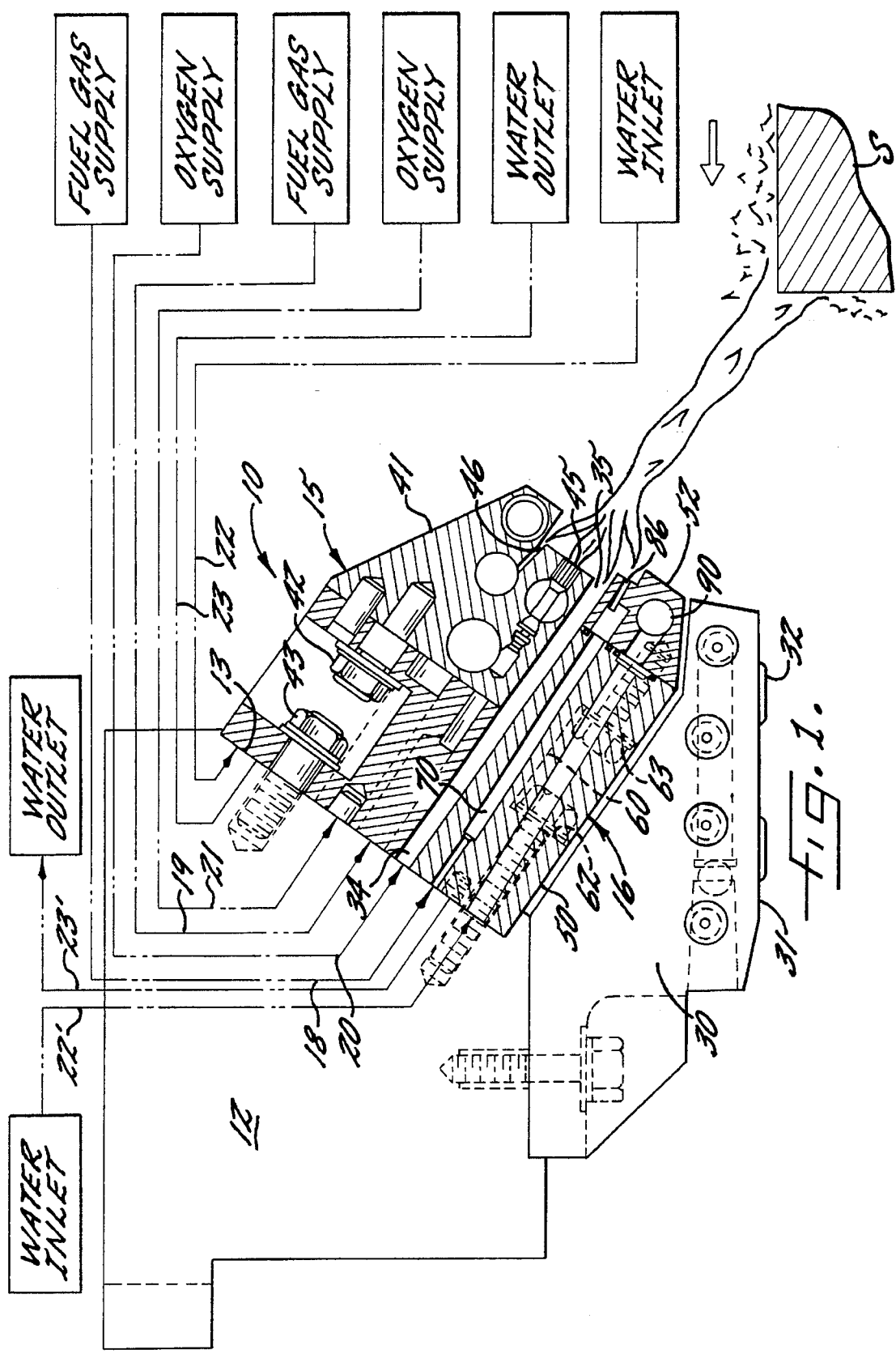

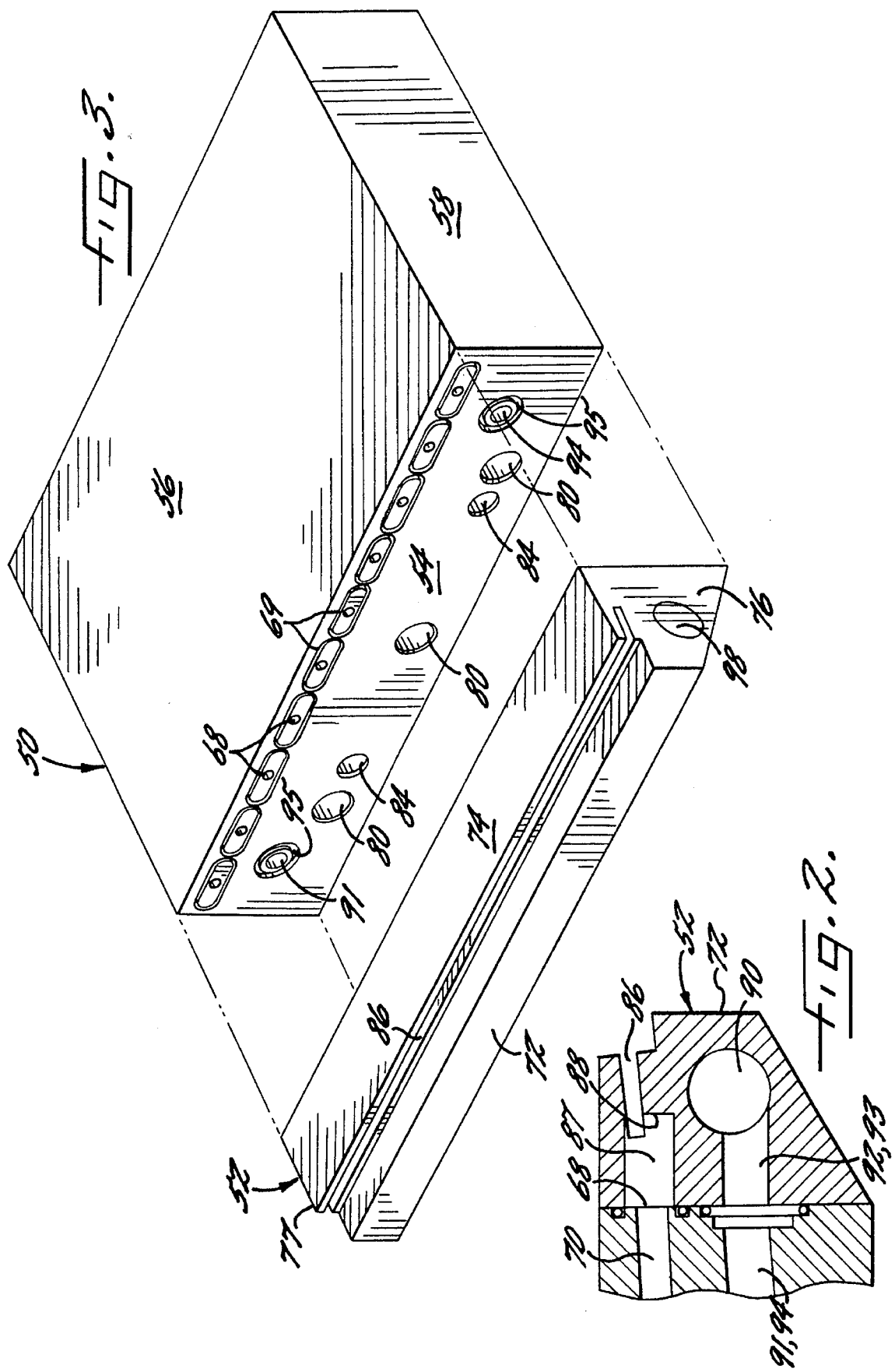

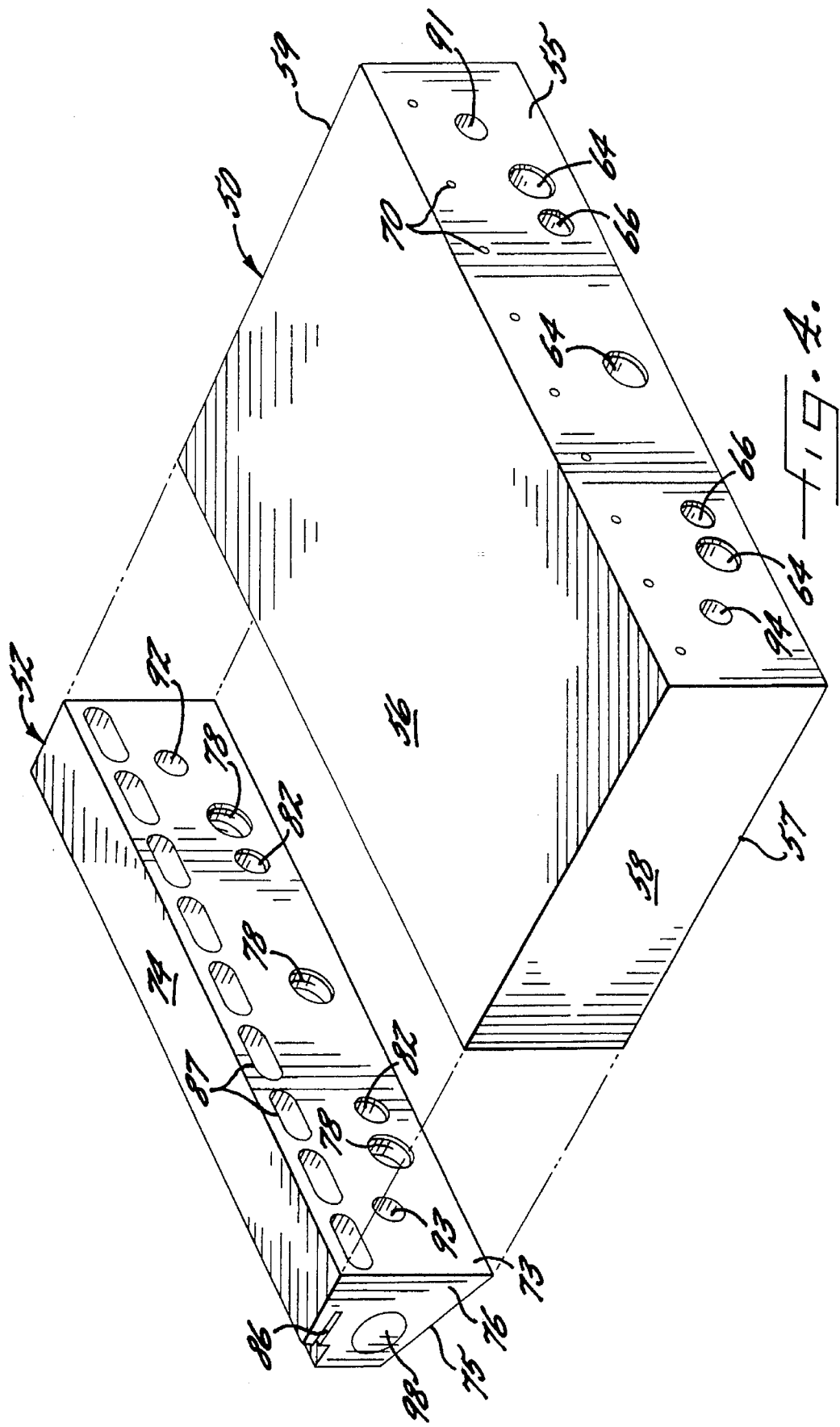

LOWER BLOCK ASSEMBLY FOR USE IN METAL SCARFING APPARATUS

FIELD OF THE INVENTION

This invention relates to an apparatus for thermochemically scarfing a metal workpiece, and more particularly, to a lower block assembly for use in a scarfing apparatus which achieves a more smooth scarfed surface on the metal workpiece.

BACKGROUND OF THE INVENTION

Steel slabs commonly are conditioned by moving scarfing units along the top, bottom, and side surfaces of a steel slab to eliminate surface defects such as cracks, seams, and slag inclusions. One conventional scarfing apparatus includes top, bottom, and opposite side scarfing units that are mounted across the width and end portions of a support, to concurrently scarf all sides of the slab as the slab is passed therebetween.

The top, side, and bottom scarfing units all include a manifold and head assembly, which receives and distributes oxygen and fuel gas to upper and lower preheat blocks. The upper and lower preheat blocks are spaced from each other to define between the two blocks an oxygen scarfing slot through which a quantity of oxygen is blown onto the slab surface to enable scarfing. The lower preheat block includes a fuel gas channel having a discharge opening positioned adjacent to the oxygen slot for discharging a fuel gas adjacent to the oxygen flow, for the purpose of maintaining the oxidation reaction on the surface of the workpiece. As illustrated for example in U.S. Pat. No. 2,838,431, the lower preheat block typically is a one-piece unit, and includes a row of separate fuel gas outlet ports extending across the width of the front face. The fuel gas is delivered to the ports through a number of laterally spaced apart fuel gas lines which extend from the rear face of the block to a transverse internal bore which is positioned just behind and in communication with the inner ends of the outlet ports. A divider bar, comprising a rod with a number of spaced apart O-ring seals, is positioned in the transverse bore so as to divide the fuel gas bore into uniform chambers. The ends of the transverse bore are closed with end seals.

As will be apparent, the components of the gas delivery system of the conventional lower block are difficult to fabricate and maintain, which adds to the expense and operating complexity of the system.

It has been previously proposed to use a continuous outlet slot for the fuel gas in the lower block, as opposed to the row of separate fuel gas outlet ports, note for example at the Jones et al., U.S. Pat. No. 2,356,197 at 49a, and the patent to Fuhrhop, U.S. Pat. No. 4,115,154 at column 6, lines 41–44. However, it is not believed that a continuous slot of this type has been adopted commercially, apparently because of the difficulty of achieving a uniform discharge of the gas along the length of the slot.

It is accordingly an object of the present invention to provide a lower block assembly for a thermochemical scarfing apparatus, which includes an efficient and simple gas delivery system for delivering a stream of fuel gas uniformly across the full width of the metal workpiece.

It is also an object of the present invention to provide a lower block assembly for a metal scarfing apparatus which achieves a more smooth scarfed surface on the workpiece.

SUMMARY OF THE INVENTION

The above and other objects and advantages of the present invention are achieved in the embodiment illustrated herein by the provision of a lower block assembly for a scarfing apparatus which comprises a block of metallic material including opposite front and rear faces, opposite upper and lower faces, and opposite end faces which define a longitudinal direction therebetween. A continuous slot extends in the longitudinal direction along the front face and extends rearwardly into the block a substantial distance, and so that the slot defines an inner end which is spaced from the rear face. Duct means is provided which comprises at least one gas supply duct extending within the interior of the block and from the rear face of the block into communication with the inner end of the slot. The duct means preferably includes baffle means in each of the supply ducts for imparting turbulence to the gas delivered thereto and so that the gas is distributed by the duct means substantially uniformly along the entire longitudinal length of said slot. By this arrangement, a gas may be delivered to the duct means at the rear face of the block and the gas uniformly flows outwardly along the entire longitudinal length of the slot at a substantially uniform rate.

Preferably, the block assembly is of two part construction, composed of an extension of the above construction, and also a base member comprising a block of metallic material including opposite front and rear faces, gas outlet means communicating with the front face of the base member block, and gas supply duct means extending through the block of the base member from the rear face thereof to the gas outlet means. The base member and the extension are interconnected with the rear face of the extension overlying and engaging the front face of the base member, and such that the gas outlet means of the base member communicates with the duct means of the extension. By this arrangement, a gas may be supplied to the gas supply duct member of the base member and delivered to the duct means of the extension. Also, the two part construction permits the extension to be removed and replaced in the event of damage from the scarfing operation, without removing the base member.

A surprising advantage of the present invention is the fact that the resultant uniform delivery of the fuel gas along the length of the continuous slot serves to produce a much smoother scarfed surface on the surface of the workpiece as compared to the blocks of the prior art.

BRIEF DESCRIPTION OF THE DRAWINGS

Some of the objects and advantages of the present invention having been stated, others will appear as the description proceeds, when taken in conjunction with the accompanying drawings, in which:

FIG. 1 is a partly sectioned and partly schematic side elevation view of a scarfing apparatus which embodies the features of the present invention and which is positioned for preheating a steel slab before the commencement of the scarfing operation;

FIG. 2 is a fragmentary view of the scarfing apparatus shown in FIG. 1;

FIG. 3 is a perspective and exploded view of the base member and extension of the lower preheat block assembly of the apparatus shown in FIG. 1;

FIG. 4 is a view similar to FIG. 2 but looking from the rear of the lower block assembly;

DETAILED DESCRIPTION OF PREFERRED EMBODIMENTS

Figure 5:
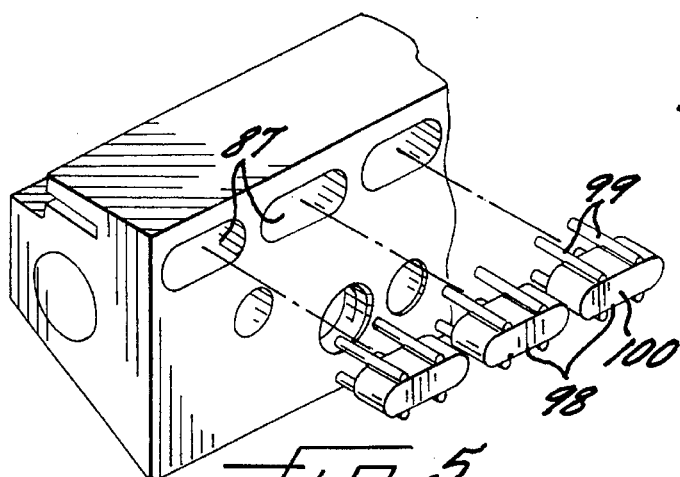
FIG. 5 is a fragmentary perspective view of the extension of the scarfing apparatus, and illustrating a second embodiment of the baffle means of the invention.

Referring more particularly to the drawings, FIG. 1 illustrates a scarfing apparatus 10 which embodies the features of the present invention. The illustrated scarfing apparatus 10 represents the upper scarfing unit of an overall system, which typically comprises similar scarfing apparatuses positioned above and below the plane of the steel slab S to be scarfed, with the upper and lower scarfing apparatus extending across the full width of the slab S. Additionally, side scarfing apparatuses of like design are positioned so as to scarf the sides of a slab S. The slab S normally is positioned on a movable roll table (not shown) so as to be fed through the rectangular configuration defined by the several scarfing apparatuses, and in the direction of the arrow 11.

As shown in FIG. 1, the apparatus 10 includes a manifold and head assembly 12, typically formed from a block of bronze or copper material, and the block defines a generally planar front surface 13 upon which an upper preheat block assembly 15 and a lower preheat block assembly 16 are mounted. The block of the manifold and head assembly 12 also includes a pair of internal fuel gas lines 18 and 19, a pair of oxygen lines 20 and 21, inlet and outlet water lines 22 and 23 respectively leading to the upper block assembly, and inlet and outlet water lines 22' and 23' respectively, leading to the lower block assembly 16. All of these lines communicate with the front surface 13 for the purposes described below.

A riding shoe 30 is mounted to the manifold and head assembly 12 along the underside of the lower preheat block 16. The riding shoe 30 includes a lower surface 31 having slab engaging skids 32 adapted to contact the slab to position the scarfing apparatus 10 a predetermined distance from the steel slabs as further described below. As shown in FIG. 1, the scarfing apparatus 10 is above the slab S, and it will be understood that similar apparatuses are arranged below and at the opposite sides of the slab S.

The upper preheat block assembly 15 and the lower preheat block assembly 16 are spaced from each other to define an oxygen slot 34 and discharge orifice 35 of predetermined size for receiving a flow of scarfing oxygen from the oxygen line 20 of the manifold and head assembly and discharging the scarfing oxygen through the discharge orifice 35 onto the steel slab S during the scarfing operation.

The upper preheat block assembly 15 includes a base member 40, and an extension 41 secured to the base member by bolts 42 and extending forwardly therefrom. The base member 40 comprises a block of metallic material, preferably copper, and the rear face of the base member is releasably secured to the front surface 13 of the manifold and head assembly by means of bolts 43.

The extension 41 of the upper preheat block assembly also comprises a block of metallic material, preferably copper, and it includes a plurality of discharge openings 45 which are positioned adjacent to each other in a longitudinal row along the front face and extending rearwardly into the block. Also, a longitudinally extending row of discharge outlets 46 is provided in the front face of the extension, with the row of outlets 46 extending parallel to and above the row of openings 45.

The structural and functional features of the upper block assembly 15 are further described in U.S. Pat. No. 5,358,221 to Showalter et al., the disclosure of which is expressly incorporated herein by reference.

The lower preheat block assembly 16 includes a base member 50, and an extension 52 secured to the base member 50 and extending forwardly therefrom. The base member 50 comprises a block of metallic material, preferably copper, and it includes opposite front and rear faces 54, 55, opposite upper and lower faces 56, 57, and opposite end faces 58, 59, which define a longitudinal direction therebetween. The lower face 57 includes a U-shaped channel 60 as seen in dashed lines in FIG. 1, so as to define a rear wall 62 and a front wall 63. The rear face 55 of the base member 50 is releasably secured to the front surface 13 of the manifold and head assembly by means of bolts which extend through openings 64 in the rear wall 62. A plurality of dowel pins (not shown) extend from the front surface 13 and into closed bores 66 (FIG. 3) in the rear wall 55 to further secure and accurately position the base member 50 to the front surface 13.

The base member 50 also includes a gas outlet means in the form of a plurality of outlets 68 which extend in a longitudinal row across the front face 54 of the member 50, with each of the outlets 68 being surrounded by an oval groove 69 which receives a sealing O-ring. Also, a plurality of parallel and longitudinally spaced apart gas supply ducts 70 extend through the block from said rear face 55 thereof to respective ones of the outlets 68. The gas supply ducts 70 in turn communicate with the fuel gas supply line 18 in the manifold and head assembly 12.

The extension 52 comprises a block of metallic material, preferably copper, and it includes opposite front and rear faces 72, 73, opposite upper and lower faces 74, 75, and opposite end faces 76, 77, which define a longitudinal direction therebetween. The rear face 73 of the extension includes three threaded openings 78 for receiving mounting bolts which extend through openings 50 in the front wall 63 of the base member. Also, a pair of dowel pins (not shown) may be secured in bores 82 in the rear face of the extension, which are also closely received in bores 84 in the front face 54. By this arrangement, the extension 52 is releasably and securely joined to the base member 50, with the rear face 73 of the extension overlying and engaging the front face 54 of the base member.

The extension 52 further comprises a continuous slot 86 extending in a longitudinal direction along the front face 72 and extending rearwardly into the block a substantial distance, and so that the slot 86 defines an inner end which is spaced from the rear face 73.

Duct means, in the form of a plurality of longitudinally spaced apart and parallel gas supply ducts 87, extends from the rear face 73 into communication with the inner end of the slot 86, for the purpose of uniformly delivering the gas along the entire longitudinal length of the slot. In the illustrated embodiment, the ducts 87 are of longitudinally elongate configuration (note FIG. 4), and they are of uniform cross section along their length. The ducts 87 are positioned to communicate with respective ones of the gas outlets 68 when the extension is assembled to the base member, with the O-rings in the grooves 69 sealing each interconnection. Also, and as best seen in FIG. 2, the ducts include an inner end wall 88, which has a height dimension greater than the height dimension of the slot 86. The end wall 88 acts as a baffle, and so that the majority of the gas entering the duct 87 from the gas supply duct 70 impinges on the end wall 88 and thus creates turbulence within the duct 87. This turbulence is believed to equalize the gas pressure within each of the ducts 87 and to uniformly distribute the gas outflow along the full longitudinal length of the slot 86 which corresponds to the longitudinal length of each duct 87, which in turn results in a more smoothly scarfed surface on the workpiece.

The extension 52 also includes an internal bore 90 extending longitudinally within the interior of the block adjacent the front face 72 thereof, and water passageway means extending through the lower block assembly 16 and communicating with the internal bore 90 and with the rear face 55 of the base member 50 for circulating water through the internal bore 90 so as to cool the block. More particularly, the water passage means comprises a water inlet passage 91 extending from the rear face 55 to the front face 54 of the base member 50, and which communicates with the water inlet line 22' in the manifold and head assembly 12 and with a water inlet line 92 which extends from the rear face 73 of the extension to the internal bore 90. A return line 93 extends through the extension 52 and communicates with the end of the internal bore 90 adjacent the end face 76. The return line 93 extends to the rear face 73 of the extension 52, and communicates with an outlet passage 94 extending through the base member. The line 94 of the base member in turn communicates with the water outlet line 23' of the manifold and head assembly. To seal the interface between the passage 91 and line 92, and the line 93 and passage 94, there is provided a channel 95 about each of the passages 91 and 94 on the front face 54 of the base member 50, which receives a sealing O-ring (not shown).

When the extension 52 and base member 50 are assembled to each other, and to the manifold assembly 12, in the manner illustrated in FIG. 1, it will be understood that the fuel gas which is delivered to the gas supply ducts 70 at the rear face 55 of the base member 50 is delivered through the ducts 70 to the gas outlets 68 in the front face 54. The fuel gas is then delivered via the ducts 87 to the inner end of the slot 86, and so that the pressure in all of the ducts 87 and along the longitudinal length of the slot is substantially uniform, in the manner described above. As a result, the flow rate of the fuel gas is substantially uniform along its entire longitudinal length.

The internal bore 90 of the extension 52 may be conveniently formed by drilling longitudinally into the end face 76 of the extension, and to a point just short of the opposite end face 77. The resulting bore is then closed with a flush cap 98 at the end face 76, as seen in FIGS. 2 and 3. Also, the other internal bores and ducts in the extension and the base member may be formed by drilling operations, in a manner which will be apparent to those skilled in the art. As a result of this construction, the opposite end faces 58, 59, 76, 77 of the base member and the extension are substantially planar, without protruding external piping connections or the like, and the upper and lower block assemblies 15, 16 may thus be mounted in a side by side arrangement with other like assemblies so as to form an assembly of a longitudinal length necessary to extend across the full width of a slab to be scarfed.

Figure 6:
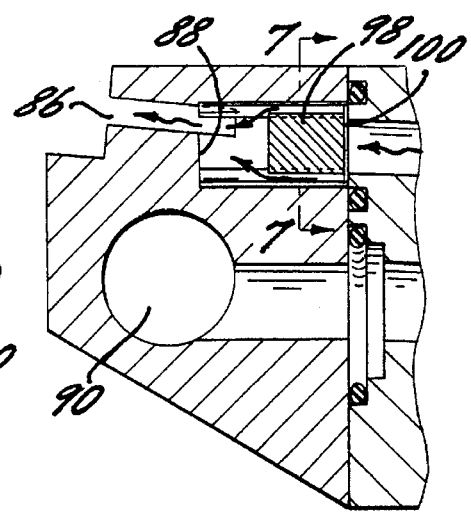
FIG. 6 is a fragmentary sectional view illustrating the extension and baffle means of FIG. 5.
Figure 7:
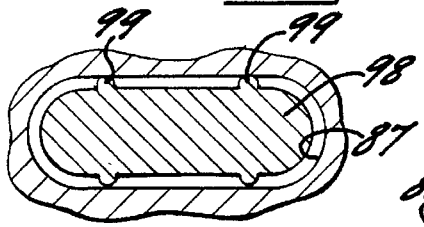
FIG. 7 is a fragmentary end view of the extension and baffle means of FIG. 5.

FIGS. 5–7 illustrate a second embodiment of the extension 52, and which includes a second embodiment of the baffle means for imparting turbulence to the gas delivered to the ducts 87. In this embodiment, the baffle means takes the form of a baffle element 98 which is removably mounted in each of the ducts 87. Each baffle element 98 comprises a solid metallic block of oblong cross section which conforms to but is somewhat smaller than the outline of the duct 87 as best seen in FIG. 7. Also, a number of legs 99 are fixed to each block so as to space the block from the peripheral walls of the duct 87 and from the end wall 88 of the duct. Thus each baffle element 98 defines an end wall 100 against which the gas entering the duct 87 impinges, and the gas then moves through the gap formed between the periphery of the element and the periphery of the duct 87 to the slot 86.

Figure 8:
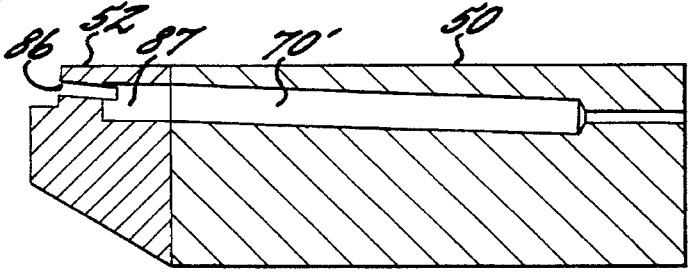
FIGS. 8, 9 and 10 are somewhat schematic sectional side elevation views illustrating three different embodiments of the baffle means of the present invention.

FIG. 8 illustrates an embodiment of the baffle means which is similar to that of FIGS. 1–4, but wherein each gas supply duct 70' in the base 50 has a cross sectional size and outline along a majority of the length of the duct 70' which corresponds to that of the associated duct 87 in the extension 52.

Figure 9:
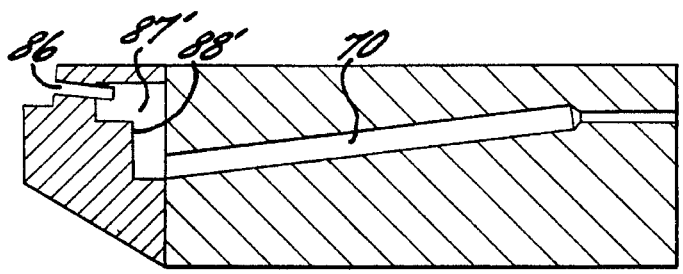

FIG. 9 illustrates a further embodiment of the baffle means wherein the duct 87' includes a shoulder 88' positioned below the duct 87' and which defines an end wall against which all of the entering gas impinges before entering the slot 86.

Figure 10:
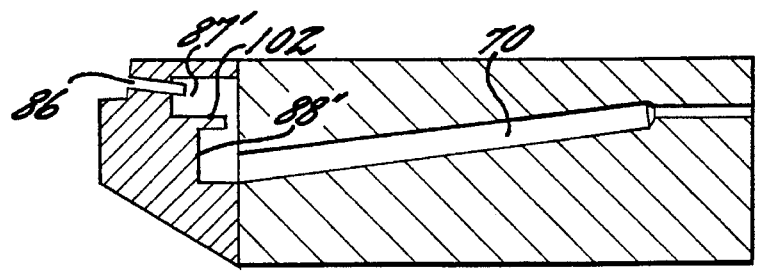

FIG. 10 illustrates still another embodiment of the baffle means, which is similar to FIG. 9 but further includes a horizontal ledge 102 between the duct 87' and shoulder 88'.

The steps involved in the initial starting and operation of the scarfing apparatus of the present invention are described in detail in U.S. Pat. No. 5,333,841, the disclosure of which is expressly incorporated herein by reference. To briefly summarize, the table (not shown) on which the steel slab S rests is moved into a position in which the scarfing apparatus 10 is positioned over and adjacent an end of the slab. The scarfing apparatus preheat fuel gas is then ignited at a low flow rate, and the preheat oxygen is also discharged at a low flow rate. The preheat fuel gas flow rate is then increased, and just after the preheat fuel gas flow rate is increased, the oxygen preheat flow is increased, and this flow includes a stabilizing oxygen stream immediately above the preheating gas stream emanating from the discharge outlets.

Once the steel slab is preheated, the preheat oxygen flow is substantially reduced and the flow of scarfing oxygen is generated through the slot 34. When the scarfing oxygen has reached its peak pressure and flow rate, the preheating fuel gas is reduced, and the table holding the steel slab is moved toward the scarfing apparatus. The table is initially moved forward at a first relatively slow speed, which is typically about 3 to 4 meters per minute, and after a predetermined period, its speed is increased to the normal scarfing speed, which is about four times as fast as the first speed. The flow rate of the oxygen is decreased slightly at the time when the table speed reaches the normal scarfing speed. Scarfing then continues, and preferably a stream of fuel gas is concurrently discharged from the slot 86 of the lower block assembly 16, to facilitate maintenance of the oxidizing reaction. Also, the manifold and head assembly 12 closes so that the skids 32 move into contact with the moving slab S, and the entire apparatus 10 "floats" on the moving slab.

In the drawings and specification, there has been set forth a preferred embodiment of this invention, and even though specific terms are used, they are used in a generic and descriptive sense only and not for purposes of limitation.

That which is claimed:

1. A block assembly for directing a continuous stream of a gas across the width of a metal workpiece during a scarfing operation, and comprising a block of metallic material including opposite front and rear faces, opposite upper and lower faces, and opposite end faces which define a longitudinal direction therebetween, a continuous slot extending in the longitudinal direction along said front face and extending rearwardly into said block a substantial distance, and so that said slot defines an inner end which is spaced from said rear face, duct means comprising a plurality of longitudinally spaced apart parallel gas supply ducts extending within the interior of said block and from said rear face of said block into communication with said inner end of said slot, and baffle means positioned in each of said gas supply ducts for imparting turbulence to the gas delivered therethrough, and so that the gas is distributed by said duct means substantially uniformly along the entire longitudinal length of said slot, whereby a gas may be delivered to said duct means at said rear face of said block and the gas flows outwardly from the entire longitudinal length of said slot at a substantially uniform rate.

2. The apparatus as defined in claim 1 further comprising an internal bore extending longitudinally within the interior of said block adjacent said front face thereof, and water passageway means communicating with said internal bore and with said rear face of said block for circulating water through said internal bore so as to cool the block.

3. The block assembly as defined in claim 1 wherein each of said gas supply ducts is of uniform cross section from said rear face of said block into communication with said inner end of said slot.

4. The block assembly as defined in claim 1 wherein said baffle means comprises an end wall positioned in each of said gas supply ducts so that a portion of the gas delivered to each gas supply duct engages said end wall and creates turbulence therein.

5. The block assembly as defined in claim 1 wherein said baffle means comprises a baffle element positioned in each of said gas supply ducts, with each of said baffle elements including an end wall positioned so that a portion of the gas delivered to each gas supply engages said end wall and creates turbulence therein.

6. The block assembly as defined in claim 1 wherein each of said gas supply ducts is of longitudinally elongate configuration.

7. A block assembly for directing a continuous stream of a gas across the width of a metal workpiece during a scarfing operation, and comprising:

a base member comprising
 (a) a block of metallic material including opposite front and rear faces,
 (b) gas outlet means communicating with said front face of said block, and
 (c) gas supply duct means extending through said block from said rear face thereof to said gas outlet means, and an extension comprising
 (a) a block of metallic material including opposite front and rear faces, opposite upper and lower faces, and opposite end faces which define a longitudinal direction therebetween,
 (b) a continuous slot extending in a longitudinal direction along said front face and extending rearwardly into said block a substantial distance, and so that said slot defines an inner end which is spaced from said rear face,
 (c) duct means comprising a plurality of longitudinally spaced apart parallel gas supply ducts extending within the interior of said block and from said rear face of said block into communication with said inner end of said slot, and baffle means positioned in each of said gas supply ducts for imparting turbulence to the gas delivered therethrough, and means interconnecting said extension and said base member with said rear face of said extension overlying and engaging said front face of said base member, and such that said gas outlet means of said base member communicates with said duct means of said extension, whereby a gas may be supplied to said gas supply duct means of said base member and delivered to said duct means of said extension.

8. The block assembly as defined in claim 7 wherein each of said gas supply ducts is of longitudinally elongate configuration.

9. The block assembly as defined in claim 8 wherein each of said gas supply ducts has a uniform cross section from said rear face of said extension block into communication with said inner end of said slot.

10. The block assembly as defined in claim 7 wherein said baffle means comprises an end wall positioned in each of said gas supply ducts so that a portion of the gas delivered to each gas supply duct engages said end wall and creates turbulence therein.

11. The block assembly as defined in claim 7 wherein said gas outlet means of said base member comprises a plurality of separate outlets, and wherein said separate outlets communicate with respective ones of said gas supply ducts of said extension.

12. The block assembly as defined in claim 11 wherein said gas supply duct means of said base member comprises a plurality of longitudinally spaced apart parallel gas supply ducts which communicate with respective ones of said outlets.

13. The block assembly as defined in claim 7 wherein said continuous slot extends across the entire longitudinal length of said front face of said extension.

14. The apparatus as defined in claim 13 further comprising an internal bore extending longitudinally within the interior of said block adjacent said front face thereof, and water passageway means communicating with said internal bore for circulating water through said internal bore so as to cool the block.

15. The block assembly as defined in claim 14 wherein said water passageway means comprises a water inlet line and a water outlet line in said extension and each communicating with said internal bore and said rear face of said extension, and a water inlet passage and a water outlet passage in said base member and each extending between said front and rear faces thereof and communicating with respective ones of said water inlet and outlet lines of said extension.

* * * * *